US010337878B2

(12) United States Patent
Kojima et al.

(10) Patent No.: US 10,337,878 B2
(45) Date of Patent: *Jul. 2, 2019

(54) SEARCH SYSTEM (71) Applicant: Clarion Co., Ltd., Saitama-shi, Saitama (JP)

(72) Inventors: Susumu Kojima, Saitama (JP); Takashi Yamaguchi, Saitama (JP); Hideki Takano, Tokyo (JP); Yasushi Nagai, Saitama (JP)

(73) Assignee: CLARION CO., LTD., Saitama (JP)

( * ) Notice: Subject to any disclaimer, the term of this patent is extended or adjusted under 35 U.S.C. 154(b) by 7 days.

This patent is subject to a terminal disclaimer.

(21) Appl. No.: 15/516,876

(22) PCT Filed: Oct. 2, 2015

(86) PCT No.: PCT/JP2015/078066
§ 371 (c)(1),
(2) Date: Apr. 4, 2017

(87) PCT Pub. No.: WO2016/056482
PCT Pub. Date: Apr. 14, 2016

(65) Prior Publication Data
US 2017/0292852 A1 Oct. 12, 2017

(30) Foreign Application Priority Data
Oct. 10, 2014 (JP) .................. 2014-209189

(51) Int. Cl.
*G01C 21/36* (2006.01)
*G06F 16/432* (2019.01)
(Continued)

(52) U.S. Cl.
CPC ..... *G01C 21/3608* (2013.01); *G01C 21/3679* (2013.01); *G06F 16/00* (2019.01);
(Continued)

(58) Field of Classification Search
None
See application file for complete search history.

(56) References Cited

U.S. PATENT DOCUMENTS 9,087,515 B2 * 7/2015 Tsuda ................ G10L 15/22
2006/0129311 A1 6/2006 Bauman et al.
(Continued)

FOREIGN PATENT DOCUMENTS

EP 2 536 097 A1 12/2012
EP 2 581 901 A2 4/2013
(Continued)

OTHER PUBLICATIONS

International Search Report corresponding to PCT/JP2015/078066, dated Nov. 2, 2015, 7 pages.
(Continued)

*Primary Examiner* — Tamara L Weber
(74) *Attorney, Agent, or Firm* — Lewis Roca Rothgerber Christie LLP (57) ABSTRACT

An in-vehicle terminal sends a spoken voice as a voice signal to a relay server, and the relay server includes a voice recognition unit which converts the received voice signal into a string, and a control unit which searches for information stored in a main database or a temporary storage database by using the string and sends a search result to the in-vehicle terminal, and, upon searching for information stored in the main database, stores the search result in the temporary storage database. Upon receiving a voice signal, when the search result is stored in the temporary storage database, the control unit searches for information stored in the temporary storage database by using the string converted from the received voice signal, and, when the search result
(Continued)

is not stored in the temporary storage database, the control unit searches for information stored in the main database by using the string.

3 Claims, 6 Drawing Sheets

(51) Int. Cl.
    *G10L 15/00*         (2013.01)
    *G10L 15/08*         (2006.01)
    *G10L 15/22*         (2006.01)
    *G10L 25/72*         (2013.01)
    *G06F 16/00*         (2019.01)

(52) U.S. Cl.
    CPC ............ *G06F 16/433* (2019.01); *G10L 15/00* (2013.01); *G10L 15/083* (2013.01); *G10L 15/22* (2013.01); *G10L 25/72* (2013.01); *G10L 2015/223* (2013.01)

(56) References Cited

U.S. PATENT DOCUMENTS

| | | | | |
|---|---|---|---|---|
| 2008/0221891 | A1* | 9/2008 | Konig | ........................... 704/252 |
| 2011/0196605 | A1* | 8/2011 | Severson | ........... G01C 21/3608 701/533 |
| 2012/0330661 | A1* | 12/2012 | Lindahl | ................... G10L 15/30 704/235 |
| 2014/0222900 | A1* | 8/2014 | Todd | ................... H04L 67/2842 709/203 |
| 2015/0066479 | A1* | 3/2015 | Pasupalak | ............... G06F 17/27 704/9 |
| 2017/0221478 | A1* | 8/2017 | Yardley | ............... G10L 15/1815 |

FOREIGN PATENT DOCUMENTS

| | | | |
|---|---|---|---|
| EP | 2 760 184 A1 | | 7/2014 |
| JP | 2004-280847 A | | 10/2004 |
| JP | 2005-32120 A | | 2/2005 |
| JP | 5266761 B2 | | 5/2013 |
| JP | 2014106927 | * | 6/2014 |

OTHER PUBLICATIONS

Extended European Search Report dated May 11, 2018 regarding European counterpart application No. 15849079.7 corresponding to U.S. Appl. No. 15/516,876 (10 pages).

Japanese Office Action dated Sep. 11, 2018 regarding Japanese Patent Application No. 2014-209189 corresponding to U.S. Appl. No. 15/516,876 (3 pages) with English Translation (3 pages).

* cited by examiner

STORAGE NUMBER: 0003

STORAGE NUMBER: 0002

STORAGE NUMBER: 0001

| | FACILITY NAME | XX BURGER ○○ SHOP |
|---|---|---|
| FACILITY ATTRIBUTE | LATITUDE/LONGITUDE | △△△△, ◇◇◇◇ |
| | STORE HOURS | 10:00～19:00 |
| | PHONE NUMBER | ○○-○○○-○○○○ |
| | ADDRESS | ○○PREFECTURE, ○CITY, ○TOWN 123-4 |
| | REPUTATION | 4.5 |

| | FACILITY NAME | YY BEEF RICE BOWL |
|---|---|---|
| FACILITY ATTRIBUTE | LATITUDE/LONGITUDE | △△◇◇, ◇◇○○ |
| | PHONE NUMBER | XX-XXX-XXXX |
| | ADDRESS | ○○PREFECTURE, △CITY, □TOWN 5-6-7 |
| | CHILD SEATING | NONE |
| | SMOKE-FREE | SEPARATE SMOKING AREA/ NON-SMOKING AREA |
| | PARKING | AVAILABLE |

| | FACILITY NAME | ZZ SANDWICH ○○ SHOP |
|---|---|---|
| FACILITY ATTRIBUTE | LATITUDE/LONGITUDE | XXX, ◇◇△△ |
| | ADDRESS | ○○PREFECTURE, △CITY, △TOWN 89 |

| STORAGE NUMBER | FACILITY NAME CANDIDATE GROUP |
|---|---|
| 0001 | XX BURGER ○○SHOP, YY BEEF RICE BOWL, ZZ SANDWICH ○○SHOP |
| 0002 | . |
| 0003 | . |

| STORAGE NUMBER | FACILITY ATTRIBUTE NAME CANDIDATE GROUP |
|---|---|
| 0001 | LATITUDE/LONGITUDE, STORE HOURS, PHONE NUMBER, ADDRESS, REPUTATION, CHILD SEATING, SMOKE-FREE, PARKING |
| 0002 | . |
| 0003 | . |

| IN-VEHICLE TERMINAL ID | STORAGE NUMBER | CREATION TIME |
|---|---|---|
| 12345 | 0001 | 8:45 |
| 23456 | 0002 | 8:55 |
| 23000 | 0003 | 9:03 |

FIG.8

SEARCH SYSTEM

CROSS-REFERENCE TO RELATED APPLICATION(S)

This application is a national stage of International Application No. PCT/JP2015/078066, filed Oct. 2, 2015, entitled "RETRIEVAL SYSTEM," which claims the benefit of priority from Japanese Patent Application No. JP 2014-209189, filed Oct. 10, 2014, in Japan. The contents of the prior applications are expressly incorporated herein by reference in their entireties.

TECHNICAL FIELD

The present invention relates to a search system including an information providing server, a relay server, and an in-vehicle terminal.

BACKGROUND ART

PTL 1 discloses a navigation device comprising a voice recognition function. This device is configured so that it can efficiently search POI (Point Of Interest) information stored therein based on the voice recognition result.

CITATION LIST

Patent Literature

Patent Literature (PTL) 1: Japanese Patent No. 5266761

SUMMARY OF THE INVENTION

Problems to be Solved by the Invention

With the invention described in PTL 1, the POI information stored in another device cannot be efficiently searched.

Means to Solve the Problems

According to the first mode of the present invention, provided is a search system including an information providing server comprising a main database, a relay server comprising a temporary storage database, and an in-vehicle terminal comprising a voice input unit, wherein the in-vehicle terminal comprises: an in-vehicle terminal communication unit which sends a spoken voice input from the voice input unit as a voice signal to the relay server, wherein the relay server comprises: a voice recognition unit which converts the voice signal received from the in-vehicle terminal into a string; a communication unit which communicates with the information providing server and the in-vehicle terminal; and a control unit which searches for information stored in the main database or the temporary storage database by using the string and sending a search result to the in-vehicle terminal, and, upon searching for information stored in the main database, stores the search result in the temporary storage database, wherein, upon receiving a voice signal, when the search result is stored in the temporary storage database, the control unit searches for information stored in the temporary storage database by using the string converted from the received voice signal, and, when the search result is not stored in the temporary storage database, the control unit searches for information stored in the main database by using the string.

According to the second mode of the present invention, in the search system of the first mode, preferably, when there is no hit in searching for information stored in the temporary storage database by using the string, the control unit of the relay server searches for information stored in the main database and sends a search result to the in-vehicle terminal and stores the search result in the temporary storage database.

According to the third mode of the present invention, in the search system of the second mode, preferably, data and the search result stored in the main database include one or more pieces of facility information, the facility information is configured from a facility name and one or more facility attributes associated with the facility name, and the facility attribute is configured from a facility attribute name and a facility attribute value, and, when the search result is stored in the temporary storage database, the control unit of the relay server separates the string into a first keyword as the facility name and a second keyword as the facility attribute name based on predetermined pattern matching, and, when the first keyword is included in the information stored in the temporary storage database and the second keyword associated with the first keyword is not included in the information, sends a message to the in-vehicle terminal.

According to the fourth mode of the present invention, in the search system of the third mode, preferably, when the first keyword is not included in the information stored in the temporary storage database, the control unit of the relay server searches for information stored in the main database by using the first keyword without sending a message to the in-vehicle terminal.

According to the fifth mode of the present invention, in the search system of one mode among the first to fourth modes, preferably, upon storing the search result of the main database in the temporary storage database, when information is stored in the temporary storage database, the control unit of the relay server deletes the information stored in the temporary storage database and thereafter stores the new search result.

Advantageous Effects of the Invention

According to the present invention, the POI information stored in another device can be efficiently searched.

DESCRIPTION OF EMBODIMENTS

Embodiments

The search system according to the present invention is now explained with reference to FIG. 1 to FIG. 8.

Figure 1:
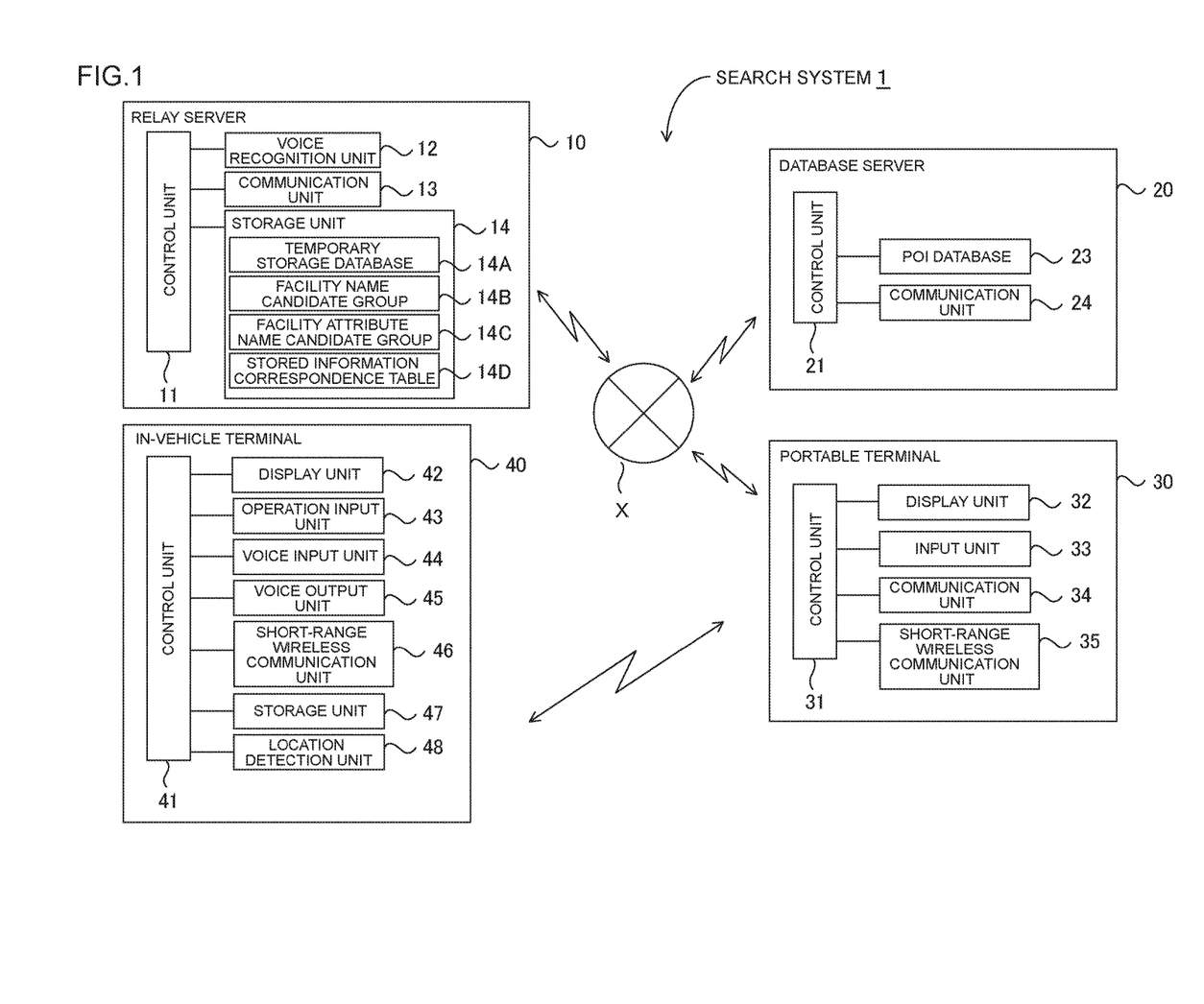
FIG. 1 is a block diagram showing a configuration of a search system.

FIG. 1 is a block diagram showing a configuration of the search system 1. The search system 1 is configured from a relay server 10, a database server 20, a portable terminal 30, and an in-vehicle terminal 40. The relay server 10, the database server 20, and the portable terminal 30 are connected via a public network X. The in-vehicle terminal 40 is connected to the portable terminal 30 via short-range wireless communication, and the in-vehicle terminal 40 can communicate with the relay server 10 via the portable terminal 30. The portable terminal 30 and the in-vehicle terminal 40 are owned and operated by the same person, and such person is referred to as the "user" in this description.

The relay server 10 comprises a control unit 11, a voice recognition unit 12, a communication unit 13, and a storage unit 14.

The control unit 11 comprises a CPU, a ROM, and a RAM (all not shown), store the programs described later in the ROM, and execute the programs by reading them into the RAM. The control unit 11 is connected to the voice recognition unit 12, the communication unit 13, and the storage unit 14 via a signal line. When the control unit 11 receives voice data from the in-vehicle terminal 40, the control unit 11 uses the voice recognition unit 12 to convert the voice data into text data. Subsequently, the control unit 11 searches the temporary storage database 14A of the storage unit 14 or the database server 20 based on the processing described later, and causes the communication unit 13 to send the search result to the in-vehicle terminal 40.

The voice recognition unit 12 is an ASIC which converts the voice information input from the control unit 11 into text data, and outputs the text data to the control unit 11.

The communication unit 13 communicates with the database server 20 and the portable terminal 30. Moreover, since the portable terminal 30 communicates with the in-vehicle terminal 40 via short-range wireless communication, the communication unit 13 can communicate with the in-vehicle terminal 40 via the portable terminal 30. While FIG. 1 only illustrates one in-vehicle terminal 40, the communication unit 13 can communicate with a plurality of in-vehicle terminals 40.

The storage unit 14 is configured from a magnetic disk, and the storage unit 14 stores a temporary storage database 14A, a facility name candidate group 14B, a facility attribute name candidate group 14C, and a stored information correspondence table 14D. The temporary storage database 14A, the facility name candidate group 14B, and the facility attribute name candidate group 14C are created for each in-vehicle terminal 40 that conducted a search, and the correspondence of the created data and the in-vehicle terminal 40 is stored in the stored information correspondence table 14D.

The temporary storage database 14A stores one or more POI data as the search result of the database server 20 as described later. One POI data is configured from a facility name, and one or more facility attributes. A facility attribute is a combination of an attribute name and an attribute value. The attribute name is, for instance, latitude/longitude, store hours, phone number, address or the like. While every POI data includes a facility name, the type and number of facility attributes will not necessarily be the same. For example, while a certain POI data may only include latitude/longitude as the facility attribute, another POI data may include information such as phone number, address, reputation, and parking as the facility attributes.

Figure 2:
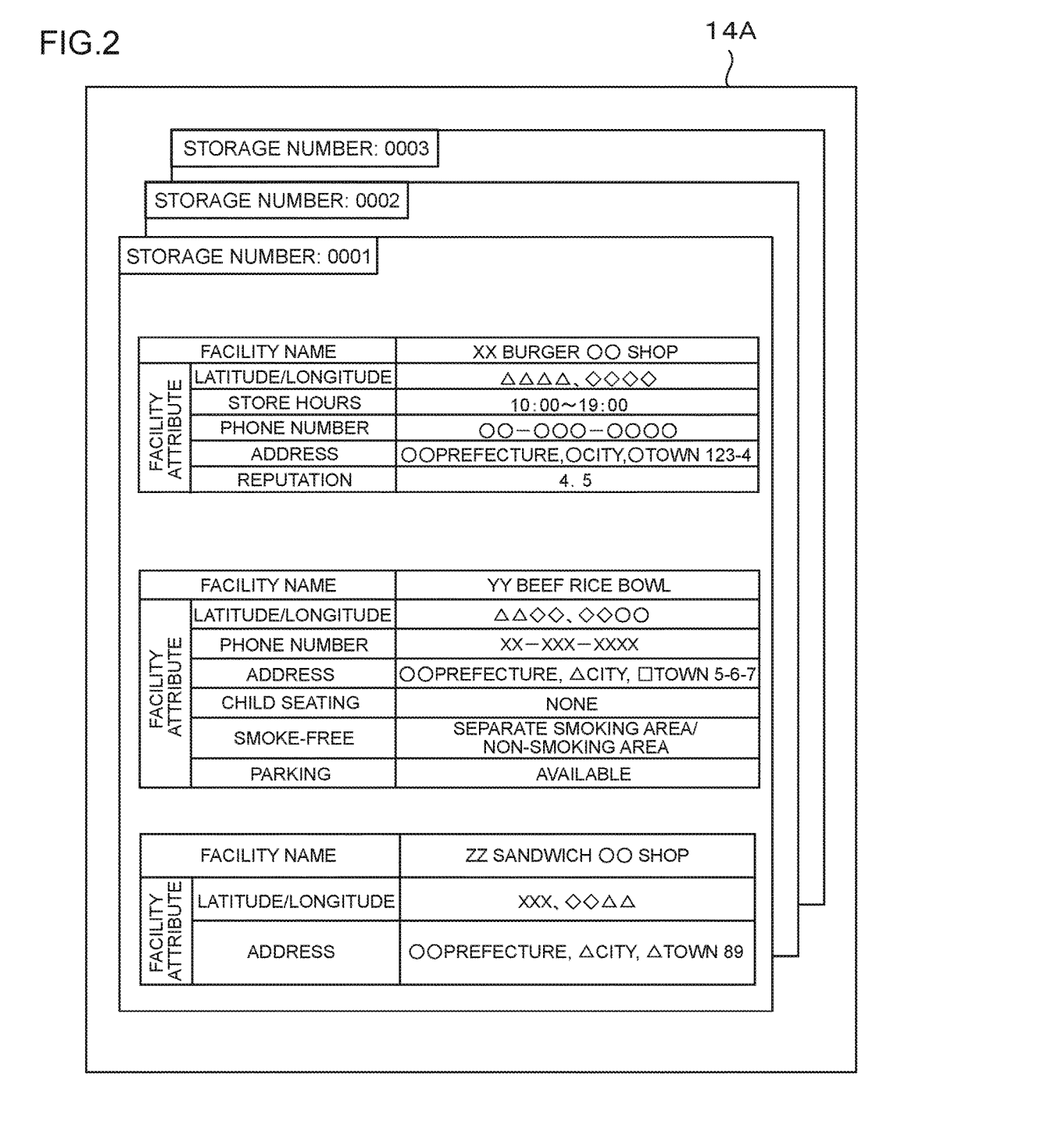
FIG. 2 is a diagram showing an example of a temporary storage database.

FIG. 2 shows an example of the temporary storage database 14A. The temporary storage database 14A shown in the example of FIG. 2 stores three POI data, and their respective facility names are "XX Burger ∘∘ Shop", "YY Beef rice bowl", and "ZZ Sandwich ∘∘ Shop". The number of facility attributes is 5, 6, and 2, respectively.

Figure 3:
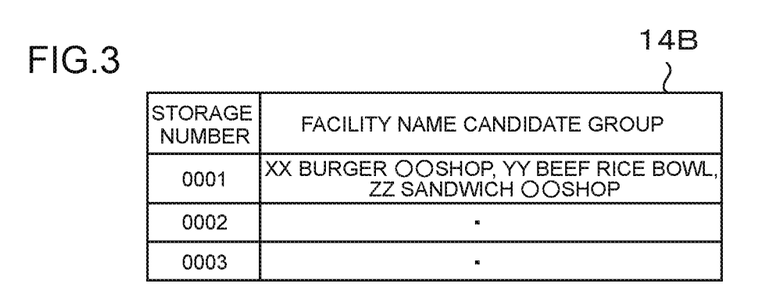
FIG. 3 is a diagram showing an example of a facility name candidate group.

The facility name candidate group 14B stores a list of the facility names included in the temporary storage database 14A. As described later, the control unit 11 reads the temporary storage database 14A, extracts the facility name therefrom, and stores the facility name in the facility name candidate group 14B.

FIG. 3 is an example of the facility name candidate group 14B, and corresponds to the example of the temporary storage database 14A shown in FIG. 2. In other words, all of the facility names illustrated in FIG. 2 are listed in the facility name candidate group 14B.

Figure 4:
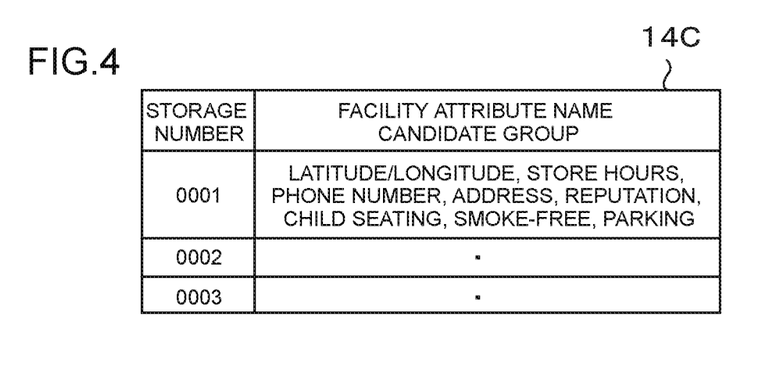
FIG. 4 is a diagram showing an example of a facility attribute candidate group.

The facility attribute name candidate group 14C stores a list of the attribute names of the facility attributes included in the temporary storage database 14A. As described later, the control unit 11 reads the temporary storage database 14A, extracts the attribute name of the facility attribute therefrom, and stores the attribute name in the facility attribute name candidate group 14C.

FIG. 4 is an example of the facility attribute name candidate group 14C, and corresponds to the example of the temporary storage database 14A shown in FIG. 2. In other words, the attribute names of all facility attributes illustrated in FIG. 2 are listed in the facility attribute name candidate group 14C.

Figure 5:
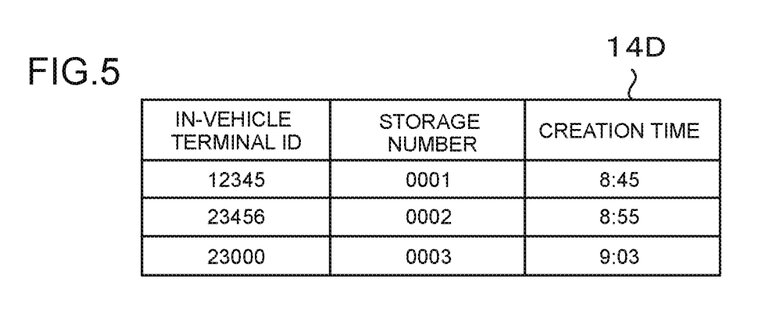
FIG. 5 is a diagram showing an example of a stored information correspondence table 14D.

The stored information correspondence table 14D stores a combination of the in-vehicle terminal ID, the stored data number, and the storage time. The in-vehicle terminal ID is an ID which identifies the respective in-vehicle terminals 40. Since the temporary storage database 14A, the facility name candidate group 14B, and the facility attribute name candidate group 14C differ for each in-vehicle terminal 40, a common stored data number is assigned thereto, and associated with the in-vehicle terminal 40 based on the in-vehicle terminal ID. Once associated with the in-vehicle terminal ID, since there is no need to store the foregoing information for a long period, the control unit 11 erases such information after the lapse of a predetermined time; for instance, 30 minutes, from the storage time to conserve the storage area of the storage unit 14.

FIG. 5 is a diagram showing an example of the stored information correspondence table 14D. Since the temporary storage database 14A of the terminal ID 12345 was created at 8:45, the temporary storage database 14A, the facility name candidate group 14B, and the facility attribute name candidate group 14C having the storage number of 0001 will be deleted by the control unit 11 after the lapse of 30 minutes, or at 9:15.

The database server 20 comprises a control unit 21, a POI database 23, and a communication unit 24.

The control unit 21 comprises a CPU, a ROM, and a RAM (all not shown), and, upon receiving the string and the latitude/longitude from the relay server 10, the control unit 21 uses the foregoing information to search the information stored in the POI database 23, and sends the search result from the communication unit 24 to the relay server 10. Nevertheless, when there is no hit in searching for the information stored in the POI database 23, "Not applicable" is sent to the relay server 10.

The POI database 23 is configured from a magnetic disk (not shown), and the POI database 23 stores a plurality of POI data. One POI data is configured from a facility name, and one or more facility attributes. The facility attribute is a combination of an attribute name and an attribute value. The attribute name is, for instance, latitude/longitude, store hours, phone number, address or the like. The POI database 23 is continually updated to the latest information.

The communication unit 24 communicates with the relay server 10 via the public network X.

The portable terminal 30 is a mobile phone or the like, and comprises a control unit 31, a display unit 32, an input unit 33, a communication unit 34, and a short-range wireless communication unit 35.

The control unit 31 comprises a CPU, a ROM, and a RAM (all not shown), and has a function of relaying the communication between the in-vehicle terminal 40 and the relay server 10 (this is hereinafter referred to as the "tethering function") by using the communication unit 34 and the short-range wireless communication unit 35 in accordance with the user's instructions given using the input unit 33. Thus, when the tethering function of the portable terminal 30 is active, the in-vehicle terminal 40 can perform processing as though it is directly communicating with the relay server 10.

The display unit 32 comprises a liquid crystal display (not shown), and displays data according to the instructions from the control unit 31.

The input unit 33 comprises a button (not shown), and conveys the user's input; for instance, the activation or the deactivation of the tethering function, to the control unit 31.

The communication unit 34 comprises an antenna and a communication module (both not shown), and communicates with the relay server 10 via the public network X.

The short-range wireless communication unit 35 comprises an antenna and a communication module (both not shown), and communicates with the in-vehicle terminal 40. For example, for this short-range wireless communication, Bluetooth (registered trademark) or a wireless LAN may be used.

The in-vehicle terminal 40 is a tablet terminal or the like, and comprises a control unit 41, a display unit 42, an operation input unit 43, a voice input unit 44, a voice output unit 45, a short-range wireless communication unit 46, a storage unit 47, and a location detection unit 48. The in-vehicle terminal 40 may be used by being fixed within the vehicle, but may also be removed and used outside the vehicle.

The control unit 41 comprises a CPU, a ROM, and a RAM (all not shown), store the programs described later in the ROM, and execute the programs by reading them into the RAM. When a voice input start signal is input from the operation input unit 43, the control unit 41 instructs the voice input unit 44 to input voices for a prescribed period, and sends, to the relay server 10, the voice data output by the voice input unit 44, the in-vehicle terminal ID, and the latitude/longitude output by the location detection unit 48. When the control unit 41 receives the search result from the relay server 10, the control unit 41 uses the display unit 42 and the voice output unit 45 to output the information, and instructs the voice input unit 44 to input voices for a prescribed period in preparation for the subsequent search by the user.

The display unit 42 comprises a liquid crystal display (not shown), and displays data according to instructions from the control unit 41.

The operation input unit 43 comprises a plurality of buttons (not shown), and conveys the user's input to the control unit 41. Based on the plurality of buttons, the movement of the cursor by the user to select an item, the selection of the selected item, and the start of voice input are conveyed to the control unit 41.

The voice input unit 44 comprises a microphone and an AD converter (both not shown), and converts the voice emitted by the user (this is hereinafter referred to as the "spoken voice") into a voice signal as digital data and outputs the voice signal to the control unit 41 according to instructions from the control unit 41. When the voice signal is input, the control unit 41 uses the short-range wireless communication unit 46 to send, to the relay server 10, the voice signal, the in-vehicle terminal ID, and the latitude/longitude output from the location detection unit 48.

The voice output unit 45 comprises a speaker and a DA converter (both not shown), and outputs the digital data, which was output from the control unit 41, as a voice.

The short-range wireless communication unit 46 comprises an antenna and a communication module (both not shown), and communicates with the portable terminal 30. For example, for this short-range wireless communication, Bluetooth (registered trademark) or a wireless LAN may be used. The portable terminal 30 can communicate with the relay server 10 by relaying the communication.

The storage unit 47 is configured from a flash memory (not shown), and the storage unit 47 stores an in-vehicle terminal ID as the identification number of the corresponding in-vehicle terminal 40.

The location detection unit 48 is configured from an antenna and a GPS receiver (both not shown), receives radio waves from a satellite according to instructions from the control unit 41 and calculates the location of the in-vehicle terminal 40; that is, the latitude and the longitude, and outputs the location information to the control unit 41. The location information is sent to the relay server 10 together with the voice data input from the voice input unit 44 and the in-vehicle terminal ID stored in the storage unit 47.

(Operation)

The operation of the search system 1 according to the present invention is now explained with reference to FIG. 6.

The portable terminal 30 is in a state of being able to use the tethering function based on the user's input via the input unit 33, the in-vehicle terminal 40 performs the following operation in a state of being able to processing as though it is directly connected with the relay server 10. Furthermore, let it be assumed that information is not stored in the temporary storage database 14A of the relay server 10.

Figure 6:
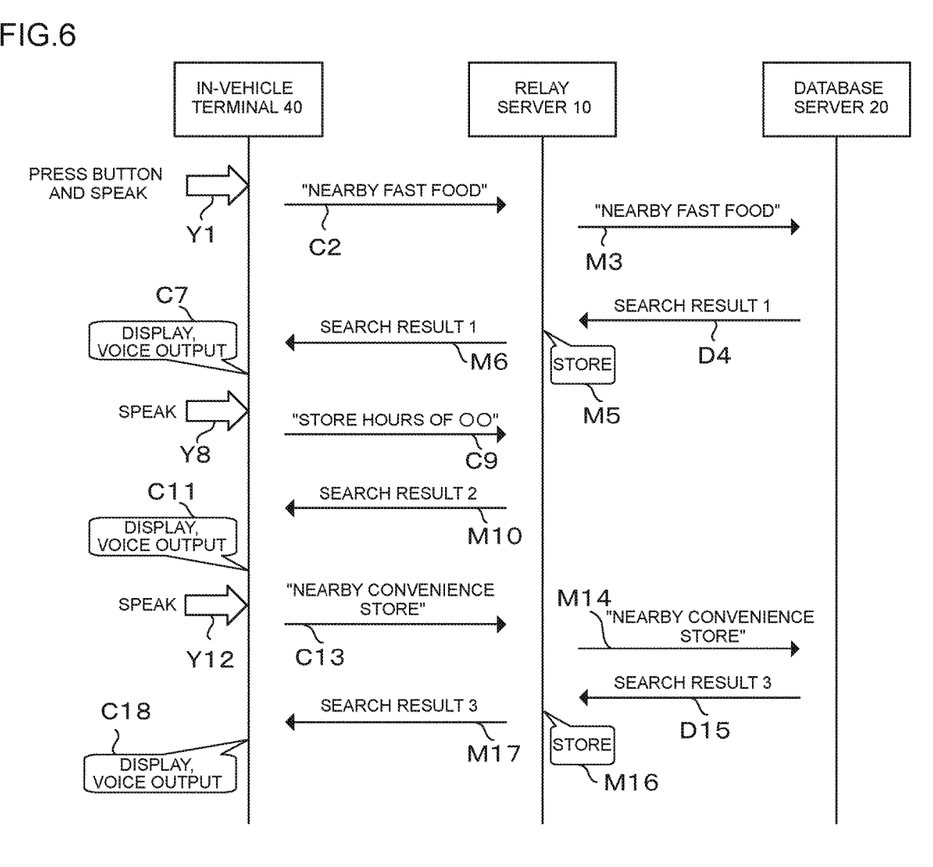
FIG. 6 is a diagram showing an example of the operation of a search system.

In FIG. 6, the portable terminal 30 which only relays the communication is omitted. FIG. 6 shows the key processing of the user, the in-vehicle terminal 40, the relay server 10, and the database server 20. In order to differentiate the respective types of processing, before the number representing the order of processing, "Y" has been added to the processing to be performed by the user, "C" has been added to the processing to be performed by the in-vehicle terminal 40, "M" has been added to the processing to be performed by the relay server 10, and "D" has been added to the processing to be performed by the database server 20. For example, "Y1" indicates that it is the first processing among the series of processing, and the agent to perform the processing is the user.

A case where the user presses the voice input start button as one type of operation input unit 43 of the in-vehicle terminal 40 and speaks the words "Nearby fast food" (Y1 of FIG. 6) is now explained. The voice input unit 44 of the in-vehicle terminal 40, based on instructions from the control unit 41, outputs the user's spoken voice as a voice signal to the control unit 41, and the control unit 41 sends the voice signal, the in-vehicle terminal ID, and the location information output by the location detection unit 48 to the relay server 10 (C2 of FIG. 6).

The relay server 10 that received the voice signal converts the received voice data into a string with the voice recognition unit 12, and searches the temporary storage database 14A with the string as the key. In this example, since data is not stored in the temporary storage database 14A, the string and the location information are sent to the database server 20 (M3 of FIG. 6).

The database server 20 that received the string from the relay server 10 searches the POI database 23 based on the received string and the location information, and sends a search result 1 to the relay server 10 (D4 of FIG. 6). Since the string is "Nearby fast food" in the example of FIG. 6, the POI related to "Fast food" existing within a predetermined range based on the latitude/longitude indicated by the location information is searched.

The relay server 10 that received the search result 1 from the database server 20 stores that search result 1 in the temporary storage database 14A (M5 of FIG. 6). The relay server 10 additionally sends the search result 1 to the in-vehicle terminal 40 (M5 of FIG. 6).

The in-vehicle terminal 40 that received the search result 1 from the relay server 10 outputs that search result 1 to the display unit 42 and outputs all facility names included in the search result 1 to the voice output unit 45 (C7 of FIG. 6). When the in-vehicle terminal 40 outputs some kind of search result, the in-vehicle terminal 40 causes the voice input unit 44 to record inputs for a predetermined time; for instance, only for one minute, in preparation for the user's subsequent speech. The display unit 42 displays, for instance, the search result shown in FIG. 7.

Figure 7:
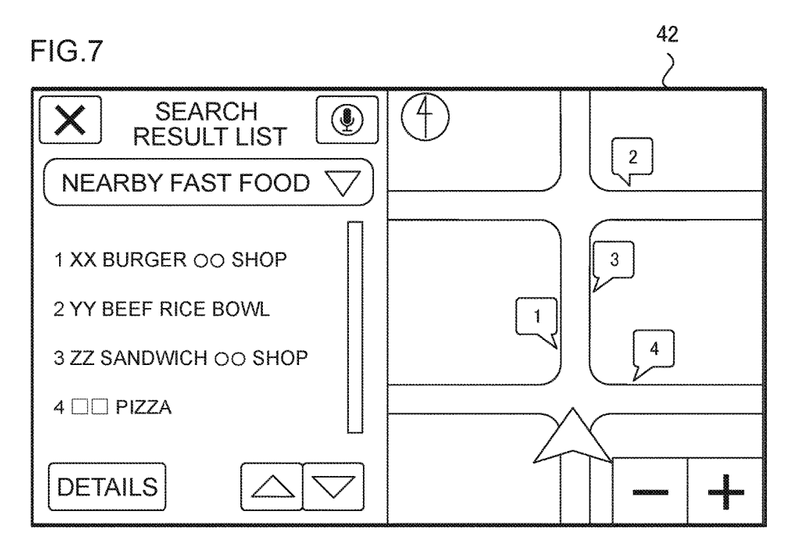
FIG. 7 is a diagram showing an example of the search result to be displayed on a display unit of an in-vehicle terminal.

FIG. 7 is a diagram showing an example of the search result to be displayed on the display unit 42 of the in-vehicle terminal 40. In other words, the display unit 42 displays the string obtained by converting the user's spoken voice via voice recognition, a list of the searched facility names, and locations of the searched facilities on a map.

While the user can use the operation input unit 43 to select a facility name displayed on the display unit 42 and display the detailed information of the selected facility, a case where the user speaks the words "store hours of XX Burger" (Y8 of FIG. 6) is now explained.

The voice input unit 44 of the in-vehicle terminal 40 converts the user's spoken voice into a voice signal and outputs the voice signal to the control unit 41, and the control unit 41 sends the voice signal, the in-vehicle terminal ID, and the latitude/longitude to the relay server 10 (C9 of FIG. 6).

The relay server 10 that received the voice data converts the received voice signal into a string with the voice recognition unit 12, and searches for information stored in the temporary storage database 14A; that is, the search result 1 as the POI data, based on predetermining processing described later with the string as the key. In other words, the relay server 10 searches for information, which coincides with the string converted from the second spoken voice, from the temporary storage database 14A. Thus, information related to the store hours of "XX Burger" included in the search result 1, and not the store hours of all "XX Burger" shops, is obtained as a search result 2, and the search result 2 is sent to the in-vehicle terminal 40 without making an inquiry to the database server 20 (M10 of FIG. 6).

The in-vehicle terminal 40 that received the search result 2 from the relay server 10 outputs that search result 2 to the display unit 42, and additionally outputs the search result 2 from the voice output unit 45 (C11 of FIG. 6).

A case where the user speaks the words "Nearby convenience store" (Y12 of FIG. 6) is now explained. As explained above, when the in-vehicle terminal 40 outputs some kind of search result, the in-vehicle terminal 40 records inputs for a predetermined time in preparation for the user's subsequent speech. Thus, when the user speaks words within the foregoing predetermined time, the user is not required to perform any special operation such as pressing the voice input start button before speaking those words.

The voice input unit 44 of the in-vehicle terminal 40 converts the user's spoken voice into a voice signal and outputs the voice signal to the control unit 41, and the control unit 41 sends the voice signal, the in-vehicle terminal ID, and the latitude/longitude to the relay server 10 (C13 of FIG. 6).

The relay server 10 that received the voice data converts the received voice signal into a string with the voice recognition unit 12, and searches for information stored in the temporary storage database 14A by using the string. Based on the processing described later, the relay server 10 determines that the database server 20 needs to be searched, and sends the string and the latitude/longitude to the database server 20 (M14 of FIG. 6).

The database server 20 that received the string and the latitude/longitude from the relay server 10 searches the POI database 23 based on the received string and latitude/longitude, and sends a search result 3 to the relay server 10 (D15 of FIG. 6).

The relay server 10 that received the search result 3 from the database server 20 stores that search result 3 in the temporary storage database 14A (M16 of FIG. 6), and additionally sends the search result 3 to the in-vehicle terminal 40 (M17 of FIG. 6).

The in-vehicle terminal 40 that received the search result 3 from the relay server 10 outputs that search result 3 to the display unit 42, and additionally outputs the search result 3 from the voice output unit 45 (C18 of FIG. 6).

As described above, when the relay server 10 receives a voice signal from the in-vehicle terminal 40, the relay server 10 converts the received voice signal into a string with the voice recognition unit 12, and determines whether or not it is necessary to make an inquiry to the database server 20 based on predetermined conditions. When it is not necessary to make an inquiry to the database server 20, since communication between the relay server 10 and the database server 20 is not required, the processing time required for the search can be shortened in comparison to the case of making an inquiry to the database server 20. Furthermore, when the user is to conduct a second search subsequent to the first search, the facility information included in the first search result is given priority in the search, and a search result intended by the user is provided.

(Flowchart)

Figure 8:
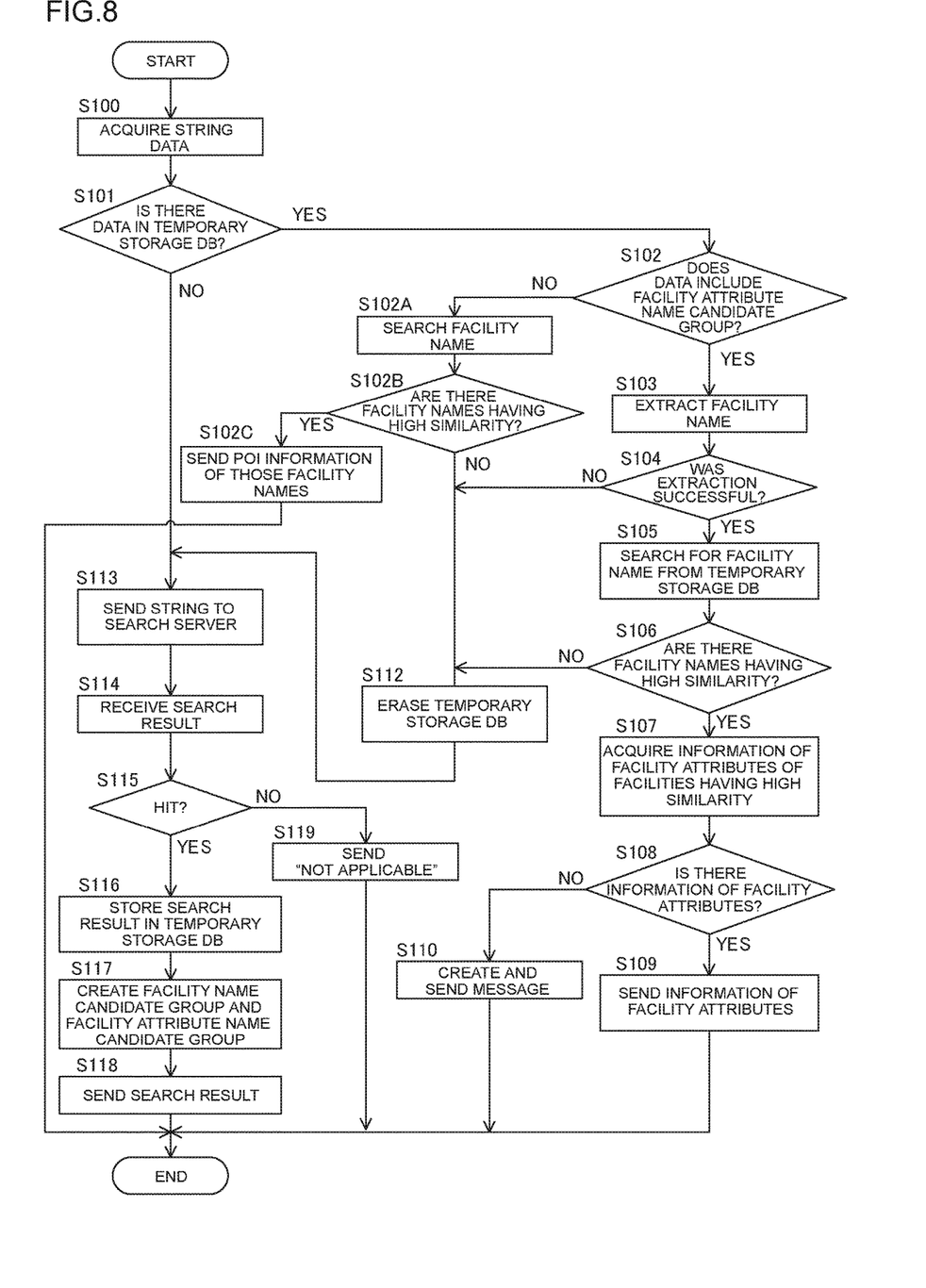
FIG. 8 is a flowchart showing an operation of a program to be executed by a control unit of a relay server.

The operation of the program to be executed by the control unit 11 of the relay server 10 in the search system 1 described above is now explained.

FIG. 8 is a flowchart showing the operation of the program to be executed by the CPU of the control unit 11 of the relay server 10. The control unit 11 executes the program indicated as a flowchart in FIG. 8 each time the communication unit 13 receives a communication from the in-vehicle terminal 40.

In step S100, the control unit 11 uses the communication unit 13 to receive the voice signal, the in-vehicle terminal ID, and the latitude/longitude, and uses the voice recognition unit 12 to convert the voice signal into a string (this is hereinafter referred to as the "converted string"), and then proceeds to step 3101.

In step S101, the control unit 11 uses the stored information correspondence table 14D to determine whether or not information associated with the in-vehicle terminal ID received in step S100 is stored in the temporary storage database 14A; that is, whether or not the in-vehicle terminal ID is included in the stored information correspondence table 14D. The control unit 11 proceeds to step S102 upon determining that such information is stored, and proceeds to step S113 upon determining that such information is not stored.

In step S102, the control unit 11 determines whether the converted string includes any one of the facility attribute names of the facility attribute name candidate group 14C. The control unit 11 proceeds to step S103 upon determining that a facility attribute name is included, and proceeds to step S102A upon determining that a facility attribute name is not included. In the ensuing explanation, a facility attribute name of the facility attribute name candidate group 14C included in the converted string is referred to as the "searched facility attribute name" in this flowchart. For example, when the converted string is "Address of YY Beef rice bowl", and the facility attribute name candidate group 14C is the example shown in FIG. 4, "address" will become the searched facility attribute name since "address" included in the converted string is stored in the facility attribute name candidate group 14C.

In step S102A, the control unit 11 searches for a facility name from the facility name candidate group 14B in which the similarity with the converted string is a predetermined value or higher, and then proceeds to step S102B. The calculation of similarity is performed, for instance, by using the Levenshtein distance or the length of the string, and the similarity is determined as being high even when the converted string coincides with a part of a facility name. In the ensuing explanation, the facility name determined as having the highest similarity is referred to as the "searched facility name". For example, when the facility name candidate group 14B includes the three facilities of "XX Burger ∘∘ Shop, YY Beef rice bowl, and ZZ Sandwich ∘∘ Shop", and the converted string is "XX Burger", the searched facility name will be "XX Burger ∘∘ Shop".

In step S102B, the control unit 11 determines whether the facility name in which the similarity with the converted string was a predetermined value or higher in the search conducted in step S102A is included in the facility name candidate group 14B. The control unit 11 proceeds to step S102C upon determining that the facility name is included in the facility name candidate group 14B, and proceeds to step S112 upon determining that the facility name is not included in the facility name candidate group 14B.

In step S102C, the control unit 11 uses the searched facility name determined in the search conducted in step S102A to extract the POI data, in which the facility name is the searched facility name, from the temporary storage database 14A, and sends the POI data to the in-vehicle terminal 40. The control unit 11 thereafter ends the flowchart of FIG. 8.

In step S103, the control unit 11 extracts the facility name from the converted string based on pattern matching. For example, the pattern is: "What is <searched facility attribute name> of <facility name>?", "<searched facility attribute name> of <facility name>", "<facility name>\s?<searched facility attribute name>", and "<searched facility attribute name>\s?<facility name>". The control unit 11 extracts the family name by using the searched facility attribute name which became known in step S102, and the plurality of patterns indicated above. Nevertheless, "\s?" indicates 1 or 0 of blank. For example, when the searched facility attribute name is "address" and the converted string is "What is the address of YY Beef rice bowl?", "YY Beef rice bowl" is extracted as the facility name based on the pattern matching using the first pattern. Furthermore, for instance, when the searched facility attribute name is similarly "address" and the converted string is "Address YY Beef rice bowl", "YY Beef rice bowl" is extracted as the facility name based on the pattern matching using the fourth pattern.

In step S104, the control unit 11 determines whether or not the extraction of the facility name based on pattern matching in step S103 was successful. The control unit 11 proceeds to step S105 upon determining that the extraction was successful, and proceeds to step S112 upon determining that the extraction was unsuccessful.

In step S105, the control unit 11 searches for a facility name candidate from the facility name candidate group 14B in which the similarity with the facility name extracted in step S103 is a predetermined value or higher. The calculation of similarity is performed, for instance, by using the Levenshtein distance or the length of the string, and the similarity is determined as being high even when the converted string coincides with a part of a facility name candidate. In the ensuing explanation, the facility name candidate determined as having the highest similarity is referred to as the "searched facility name".

In step S106, the control unit 11 determines whether the facility name in which the similarity with the converted string was a predetermined value or higher in the search conducted in step S105 is included in the facility name candidate group 14B. The control unit 11 proceeds to step S107 upon determining that the facility name is included in the facility name candidate group 14B, and proceeds to step S112 upon determining that the facility name is not included in the facility name candidate group 14B.

In step S107, the control unit 11 searches for the attribute value of the searched facility attribute name associated with the searched facility name from the temporary storage database 14A, and then proceeds to step S108. For example, when the temporary storage database 14A is the example shown in FIG. 2, the searched facility name is "XX Burger ∘∘ Shop", and the searched facility attribute name is "Reputation", "4.5" as the attribute value thereof is obtained. Nevertheless, when the searched facility name is "YY Beef rice bowl", and the searched facility attribute name is "Reputation", since "YY Beef rice bowl" does not have the facility attribute of "Reputation", the facility attribute value thereof cannot be obtained.

In step S108, the control unit 11 proceeds to step S109 upon determining that a facility attribute value was obtained in step S107, and proceeds to step S110 upon determining that a facility attribute value could not be obtained; that is, upon determining that the searched facility attribute name was not associated with the searched facility name.

In step S109, the control unit 11 sends the facility attribute value obtained in step S107 to the in-vehicle terminal 40, and then ends the flowchart of FIG. 8.

In step S110, the control unit 11 sends a message to the effect of "information related to the facility of the searched facility name is included, but information related to the facility attribute of the searched facility attribute name is not included" and the POI information related to the facility of the searched facility name to the in-vehicle terminal 40, and then ends the flowchart of FIG. 8.

When it is determined that there is no facility name with a high similarity in steps S102B, S106 or it is determined that the extraction of the facility name was unsuccessful in step S104, the control unit 11 executes step S112. In step S112, the control unit 11 deletes the temporary storage database 14A, the facility name candidate group 14B, and the facility attribute name candidate group 14C associated with the received in-vehicle terminal ID, deletes the description of the corresponding in-vehicle terminal ID from the stored information correspondence table 14D, and then proceeds to step S113.

When it is determined that the temporary storage database 14A is not stored in step S101 and after the execution of step S112, the control unit 11 sends the converted string and the received latitude/longitude to the database server 20 in step S113, and then proceeds to step S114.

In step S114, the control unit 11 receives, from the database server 20, the search result from the search of the POI database 23 using the information sent in step S113, and then proceeds to step S115.

In step S115, the control unit 11 determines whether the search result received from the database server 20 in step S114 is some type of POI information; that is, whether there was a hit in the search of the database server 20. The control unit 11 proceeds to step S116 upon determining that the search result from the database server 20 is POI information, and proceeds to step S119 upon determining that the search result is not POI information, for instance, an error message such as "No corresponding data".

In step S116, the control unit 11 refers to the stored information correspondence table 14D and sets the smallest unused positive integer as the storage number, and stores the search result received in step S114, together with the storage number thereof, as the temporary storage database 14A in the storage unit 14. Subsequently, the control unit 11 records the in-vehicle terminal ID, the storage number, and the current time in the stored information correspondence table 14D, and then proceeds to step S117.

In step S117, the control unit 11 uses the temporary storage database 14A, in which the search result was stored therein in step S116, to create the facility name candidate group 14B and the facility attribute name candidate group 14C, and stores the created facility name candidate group 14B and facility attribute name candidate group 14C in the storage unit 14. Here, the same storage number as the information stored in the temporary storage database 14A used for creating the facility name candidate group 14B and the facility attribute name candidate group 14C is assigned and associated.

In step S118, the control unit 11 sends the search result received in step S114 to the in-vehicle terminal 40, and then ends the flowchart of FIG. 8.

In step S119, the control unit 11 sends a message to the effect of "No corresponding data" to the in-vehicle terminal 40, and then ends the flowchart of FIG. 8.

The following effects can be yielded according to the embodiment described above.

(1) The search system 1 includes a database server 20 comprising a POI database 23, a relay server 10 comprising a temporary storage database 14A, and an in-vehicle terminal 40 comprising a voice input unit 44. The in-vehicle terminal 40 comprises a short-range wireless communication unit 46 which sends a spoken voice input from the voice input unit 44 as a voice signal to the relay server 10. The relay server 10 comprises a voice recognition unit 12 which converts the voice signal received from the in-vehicle terminal 40 into a string, a communication unit 13 which communicates with the database server 20 and the in-vehicle terminal 40, and a control unit 11 which searches for information stored in the POI database 23 or the temporary storage database 14A by using the string and sends a search result to the in-vehicle terminal 40, and, upon searching for information stored in the POI database 23, stores the search result in the temporary storage database 14A. Upon receiving a voice signal, when the search result is stored in the temporary storage database 14A, the control unit 11 searches for information stored in the temporary storage database 14A by using the string converted from the received voice signal, and, when the search result is not stored in the temporary storage database 14A, the control unit 11 searches for information stored in the POI database 23 by using the string.

The relay server 10 converts the user's spoken voice received from the in-vehicle terminal 40 into a string, and searches for data which is the previous search result and stored in the temporary storage database 14A of the relay server 10. Since the search based on the converted string also involves the previous search result, the user can conduct a speech-based refine search. Furthermore, the time required for the search can be shortened since it is not necessary to make an inquiry to the database server 20. In other words, the relay server 10 can efficiently search for the POI information stored in the POI database 23 equipped in the database server 20, which is another device. Since the POI database 23 is continually updated to the latest information, the relay server 10 and the in-vehicle terminal 40 can obtain a highly fresh search result with an enormous amount of POI data as the search target.

(2) When there is no hit in searching for information stored in the temporary storage database 14A by using the string, the control unit 11 of the relay server 10 searches for information stored in the POI database 23 and sends a search result to the in-vehicle terminal 40 and stores the search result in the temporary storage database 14A of the storage unit 14.

Thus, the user can obtain the search result of the POI database 23 when there is no hit in the search of the temporary storage database 14A. Furthermore, since the temporary storage database 14A equipped in the relay server 10, the search of data stored in the temporary storage database 14A and be performed without communication and can be completed in a short time, and the disadvantage of searching the temporary storage database 14A is minimal.

(3) Data and the search result stored in the POI database 23 include one or more pieces of facility information, the facility information is configured from a facility name and one or more facility attributes associated with the facility name, and the facility attribute is configured from a facility attribute name and a facility attribute value, and wherein, when the search result is stored in the temporary storage database 14A, the control unit 11 of the relay server 10 separates the string into a first keyword as the facility name and a second keyword as the facility attribute name based on predetermined pattern matching, and, when the first keyword is included in the information stored in the temporary storage database 14A and the second keyword associated with the first keyword is not included in the information, sends a message to the in-vehicle terminal 40.

Thus, the user can know that the reason why the intended search result could not be obtained was because data of the facility attribute spoken as the facility name was not stored in the POI database 23.

(4) When the first keyword is not included in the information stored in the temporary storage database 14A, the control unit 11 of the relay server 10 searches for information stored in the POI database 23 by using the first keyword without sending a message to the in-vehicle terminal 40.

When the user speaks a facility name that is not included in the temporary storage database 14A, since it is assumed that the user is intending to conduct a new search and not a refine search, a new search; that is, the search of the POI database 23, is conducted, without troubling the user to send a message.

(5) Upon storing the search result of the POI database 23 in the temporary storage database 14A, when information is stored in the temporary storage database 14A, the control unit 11 of the relay server 10 deletes the information stored in the temporary storage database 14A and thereafter stores the new search result.

Thus, only the immediately preceding search result will be stored in the temporary storage database 14A, and an effective refine search can thereby be conducted.

Modified Example 1

In the foregoing embodiments, the in-vehicle terminal 40 could not be directly connected to the public network X, and used the so-called tethering function of the portable terminal 30, but the communication configuration of the in-vehicle terminal 40 is not limited thereto. The in-vehicle terminal 40 may also comprise a communication unit that can be connected to the public network X, and communicate with the relay server 10 without going through the portable terminal 30.

In the foregoing embodiments, the control unit 41 of the in-vehicle terminal 40 sent the voice signal input from the voice input unit 44 to the relay server 10, and the voice data was converted into a string with the voice recognition unit 12 of the relay server 10, but the functions of the in-vehicle terminal 40 are not limited thereto. The in-vehicle terminal 40 may also comprise a voice recognition unit and independently convert the input voice data into a string and then send the string to the relay server 10.

Modified Example 2

In the foregoing embodiment, while there was only one database server 20, there may also be a plurality of database servers 20.

For example, a part of the search system 1 may be configured from three database servers 20A, 20B, 20C in substitute for the database server 20, and these three servers may have a POI database which specializes in sightseeing, business, and dining, in that order. Furthermore, by selecting one mode among sightseeing, business, and dining and storing the selected mode in the storage unit 47 prior to the user's speech-based search and sending the selected mode, together with the data of the user's spoken voice, to the relay server 10, the relay server 10 may select which database server should be used. In other words, four types of data; specifically, voice data, in-vehicle terminal ID, latitude/longitude as the self-location of the in-vehicle terminal 40, and search mode, may be sent from the in-vehicle terminal 40 to the relay server 10.

According to this modified example 2, a plurality of specialized POI databases can be switched and used based on the user's instructions.

Each of the foregoing embodiments and modified examples may also be respectively combined.

While various embodiments and modified examples were explained above, the present invention is not limited to the subject matter thereof. Other modes considered to fall within the technical scope of the present invention are also covered by the scope of the present invention.

The disclosure of the following priority application is incorporated herein by reference.

Japanese Patent Application No. 209189 of 2014 (filed on Oct. 10, 2014)

REFERENCE SIGNS LIST

1 . . . Search system
10 . . . Relay server
11 . . . Control unit
12 . . . Voice recognition unit
13 . . . Communication unit
14 . . . Storage unit
14A . . . Temporary storage database
14B . . . Facility name candidate group
14C . . . Facility attribute candidate group
14D . . . Stored information correspondence table
20 . . . Database server
21 . . . Control unit
23 . . . POI database
24 . . . Communication unit
40 . . . In-vehicle terminal
41 . . . Control unit
42 . . . Display unit
43 . . . Operation input unit
44 . . . Voice input unit
45 . . . Voice output unit
46 . . . Short-range wireless communication unit

The invention claimed is:

1. A search system comprising:
an information providing server comprising a main database,
a relay server comprising a temporary storage database, and
an in-vehicle terminal comprising a microphone,
wherein the in-vehicle terminal comprises an in-vehicle terminal communication circuit which transmits an in-vehicle terminal ID and a spoken voice input from the microphone as a voice signal to the relay server; and
wherein the relay server comprises:
a voice recognition circuit which converts the voice signal received from the in-vehicle terminal into a data string;
a communication circuit which communicates with the information providing server and the in-vehicle terminal; and
a control circuit which searches for information stored in the main database or the temporary storage database by using the data string and sends a search result to the in-vehicle terminal, and upon searching for information stored in the main database, stores the search result with the in-vehicle terminal ID in the temporary storage database,
wherein upon receiving a voice signal and the in-vehicle terminal ID, when information associated with the in-vehicle terminal ID is stored in the temporary storage database, the control circuit searches for information stored in the temporary storage database by using the data string, wherein, when the information associated with the in-vehicle terminal ID is not stored in the temporary storage database, the control circuit searches for information stored in the main database by using the data string, wherein when there is no match in searching for information stored in the temporary storage database by using the data string, the control circuit searches for information stored in the main database and sends a search result to the in-vehicle terminal and stores the search result in the temporary storage database, wherein wherein the data and the search result stored in the main database include one or more pieces of facility information, the facility information is configured from a facility name and one or more facility attributes associated with the facility name, and the facility attribute is configured from a facility attribute name and a facility attribute value, and wherein, when the received in-vehicle terminal ID is stored in the temporary storage database, the control circuit separates the data string into a first keyword as the facility name and a second keyword as the facility attribute name based on a predetermined pattern matching, and when the first keyword is included in the information stored in the temporary storage database and the second keyword associated with the first keyword is not included in the information, the control circuit sends a message to the in-vehicle terminal without searching the information stored in the main database, wherein the message indicates that the first keyword is included in the information and the second keyword associated with the first keyword is not included in the information.

2. The search system according to claim 1, wherein, when the first keyword is not included in the information stored in the temporary storage database, the control circuit of the relay server searches for information stored in the main database by using the first keyword without sending a message to the in-vehicle terminal.

3. The search system according to claim 1, wherein, upon storing the search result of the main database in the temporary storage database, when information is stored in the temporary storage database, the control circuit of the relay server deletes the information stored in the temporary storage database and thereafter stores the new search result.

* * * * *